PRODUCTION OF FINELY DIVIDED POLYOLEFIN FROM PREFORMED POLYMERIC GEL

Leszek Jan Konrad Krzyszkowski, Wyandotte, Mich., assignor to Pennsalt Chemicals Corporation, Philadelphia, Pa., a corporation of Pennsylvania
No Drawing. Filed Dec. 19, 1960, Ser. No. 76,444
8 Claims. (Cl. 260—29.6)

This invention relates to a process for the preparation of finely divided particles of polyolefin resin. More particularly it relates to the disintegration of polyethylene, polypropylene and co-polymers of ethylene and propylene with other olefins into finely powdered form from larger particles or masses.

Thermoplastic resins in powder form are useful for protectively or decoratively coating surfaces onto which the powder is applied while the surface is heated at or above the melting point of the resin. Such powders also are useful for molding shaped articles. Polyethylene, polypropylene and their co-polymers with each other have utility for each of such purposes. For some uses, the size and shape of the particles are not important. However, the forming of shaped articles from a sintered polyolefin powder for applications as filter media, battery separators and electrolytic diaphragms represents a type of use which requires powder of a more uniform and finer particle size and of a more regular particle shape than that commonly available.

Particles of polyethylene have previously been prepared by a variety of methods generally applicable to thermoplastic resins. Grinding by various dry or wet procedures is well established but gives relatively coarse particles of irregular shapes and of a wide particle size distribution.

Producing polyethylene powder from gel, precipitated by chilling the dilute resin solution, and subsequently disintegrating the gel and removing the solvent in mechanical equipment such as a tumbler is taught in British Patents Nos. 571,814 and 617,052.

There also are a number of methods for producing stable aqueous polyethylene dispersions and emulsions, particularly from the lower molecular weight grades of resin, which were developed by resin manufacturers for coating paper or textiles. U.S. 2,313,144 teaches a process for making such stable dispersions or emulsions. Such stable dispersions, however, are not applicable to the production of polyolefins in powder form.

A process is described in Italian Patent No. 470,599 according to which a finely divided dispersion of polyethylene gel in excess organic solvent is prepared by the process of chilling the liquid gel with rapid stirring in the presence of silicone oil to prevent agglomeration during removal of excess solvent. Also, polyethylene in a powder form is produced in a modification of this process by grinding the solid gel in a mill, or by pressing it through a screen, and then evaporating the solvent at a temperature below the fusion point of the gel.

With the purpose of filling the need for a very fine polyolefin powder of a uniform character especially useful for forming applications, I have developed a novel process which results in the production of such powder even from the toughest grades of polyolefins. My process is equally suitable for pulverizing low, medium and high density polyethylenes, polypropylenes and copolymers of ethylene and propylene with other olefins. Powders even with particle size all below about 70 microns in size and with a very narrow distribution range, normally about 15–35 microns, are produced from said resins by practice of my hereinafter described process.

My process for producing finely divided polyolefin powder comprises disintegrating into fine particles by means of shearing action a preformed gel of polyolefin resin and an organic solvent dispersed in aqueous medium containing an effective amount of a surfactant having a hydrophile-lipophile balance value of at least 10 at a temperature below the fusion point of said gel and leaching the solvent from the sheared gel particles by means of said medium.

The polyethylene resins to which my process is applied are definable in terms of densities and melt indices. These properties are known in the art to be correlated to the chemical properties and other physical characteristics of the resins. The polyethylenes available on the market are termed low-density (sp. gr. up to 0.925), medium-density (sp. gr. 0.926 to 0.940) and high-density (sp. gr. 0.941 to 0.965) materials. In contrast to the polyethylene resins, commercial polypropylene resins have a narrow range of density, of from 0.90 to 0.91. By melt index of a polymer is meant the number of grams of the molten polymer which will flow through a standard orifice at a standard temperature and pressure in a given time. The higher the melt index, the more fluid is the melt. Melt indices range from about 0.3 to about 30.

The majority of the commercially available polyethylene powders are produced by grinding processes. For that reason the powders are rather coarse (e.g. about all through 60 mesh), and the particles have an irregular shape. Most of these powders are made from low density polyethylenes of a molecular weight of about 20,000 or lower and a melt index of about 1, as the resins much above this molecular weight or below melt index 1 are very hard to pulverize by grinding. Also, some high density poleythylenes are available only in the form of course, irregularly shaped particles and, therefore, their utility is limited largely to coating and molding operations.

For use in sintering processes to form porous bodies of small uniform pore size, a very fine particle size powder with a narrow particle size distribution range and regular or pebble shaped particles is required. Moreover, the powder should be made of a high molecular weight resin with the lowest possible melt index to prevent stress cracking in the formed body produced and to secure a uniform fusion of the particles. My invention provides a means for producing such powder.

The polyolefin gels used in the practice of my process are prepared by relatively simple and well known procedures. In general, the resin is dissolved, preferably with stirring, in an organic solvent, preferably a volatile one, at elevated temperature. The gel is then precipitated by cooling the solution. Gels can be prepared by using an excess of solvent and removing the excess solvent by decantation or filtration. Preferably a minimum excess of solvent is used and the heated gel is used directly in the dispersing, disintegrating and leaching step of my process.

Gels may be prepared using a wide variety of nonpolar solvents and solvent types, and the choice of solvent is not critical to my process. However, for practical purposes, I generally prefer to employ gels prepared with hydrocarbon and halohydrocarbon solvents. Aliphatic and aromatic hydrocarbons and halohydrocarbons are preferred for use with low and medium weight density resins. Examples of these solvents are heptane, benzene and trichloroethylene, with heptane being especially preferred. Aromatic hydrocarbons and aromatic halohydrocarbons are preferred for use with the high density polyethylenes and for polypropylenes and copolymers of ethylene and propylene with other olefins. Examples of these solvents are toluene, xylene and chlorobenzene, with xylene being especially preferred. Commercial grades of solvents have been found suitable for use in my process.

The gel is dispersed, disintegrated and leached free of solvent by subjecting it to shearing action in an aqueous medium containing essentially a predominantly hydrophilic surfactant system. I have found that the hydrophile-lipophile character of the surfactant used in the practice of the invention is of critical importance for the production of very fine resin particles, especially those which are all smaller than about 70 microns. For this purpose the surfactant system must be one having a particular balance between the hydrophilic and lipophilic portions of its component molecular structure or structures in order that its effect is definitely hydrophilic in character. A description of hydrophile-lipophile balance, hereinafter referred to as HLB value, and a rating of some surfactants with regard to this property is found in Becher, "Emulsions: Theory and Practice," Reinhold Publishing Corp., N.Y. (1957), pages 189–199. In the HLB value system, numbers have been assigned to many surfactants according to the determined hydrophile-lipophile balance of each surfactant. According to the system, the lower the HLB value, the more lipophilic is the material and conversely, the higher the HLB value, the more hydrophilic is the surfactant. A surfactant system of a given HLB value can be obtained either by use of an individual surfactant or by use of a mixture of surfactants having different HLB values, as is known in the art.

I have found that a surfactant system with an HLB value higher than about 10 is essential for practice of my invention. I have found it further advantageous in producing extremely fine powders to employ individual surfactants having HLB values well above 10, and in some instances as high as 30 or more, and I prefer to use such individual surfactants. Furthermore, I have found that many highly hydrophilic surfactants have the added advantage of imparting temporary anti-static properties to the dried powdered resin, thus facilitating further processing. Such surfactants are especially preferred for carrying out my invention.

Preferred hydrophilic surfactants which I have found useful for practicing my invention are chemically designated as derivatives of polyoxyethylene. They include, for example, the following materials having HLB values as shown:

| Surfactant: | HLB |
|---|---|
| Polyoxyethylene sorbitan monooleate | 10.0 |
| Polyoxyethylene sorbitol hexaoleate | 10.2–11.4 |
| Polyoxyethylene esters of mixed fatty and resin acids | 10.2–13.5 |
| Polyoxyethylene cetyl ether | 10.3 |
| Polyoxyethylene sorbitan tristearate | 10.5 |
| Polyoxyethylene lauryl ether | 10.8–16.9 |
| Polyoxyethylene sorbitan trioleate | 11.0 |
| Polyoxyethylene oxypropylene oleate | 11.0 |
| Polyoxyethylene lanolin derivative | 11.0 |
| Polyoxyethylene monooleate | 11.1–11.4 |
| Polyoxyethylene monostearate | 11.1–18.8 |
| Polyoxyethylene monopalmitate | 11.6 |
| Polyoxyethylene monolaurate | 12.8–16.3 |
| Polyoxyethylene nonyl phenol | 10.0–17.1 |
| Polyoxyethylene sorbitol lanolin derivatives | 13.0–16.0 |
| Polyoxyethylene alkyl aryl ether | 13.0 |
| Polyoxyethylene castor oil | 13.3 |
| Polyoxyethylene vegetable oil | 13.3 |
| Polyoxyethylene sorbitan monolaurate | 14.9–16.7 |
| Polyoxyethylene sorbitan monostearate | 14.9 |
| Polyoxyethylene sorbitan monooleate | 15.0 |
| Polyoxyethylene oleyl ether | 15.3–16.6 |
| Polyoxyethylene stearyl alcohol | 15.3 |
| Polyoxyethylene oleyl alcohol | 15.4 |
| Polyoxyethylene fatty alcohol | 15.4 |
| Polyoxyethylene glycol monopalmitate | 15.5 |
| Polyoxyethylene sorbitan monopalmitate | 15.6 |
| Polyoxyethylene cetyl alcohol | 15.7 |
| Polyoxyethylene oxypropylene stearate | 15.7 |
| Polyoxyethylene mannitan monolaurate | 16.7 |
| Polyoxyethylene fatty amine | 25.0 |

Other hydrophilic surfactants which are useful include the following material having HLB values as shown:

| Surfactant: | HLB |
|---|---|
| Alkyl aryl sulfonate | 11.7 |
| Triethanolamine oleate | 12.0 |
| Sodium oleate | 18.0 |
| Potassium oleate | 20.0 |
| N-cetyl N-ethyl morpholinium ethosulfate | 25–30 |
| N-soya-N-ethyl morpholinium ethosulfate | 25–30 |
| Sodium lauryl sulfate | App. 40 |

The alkali-metal, ammonium and organic amine salts of each of the above listed polyoxyethylene and other non-salt surfactants can also be used, provided the HLB number of the salt is at least 10. Also, a mixture of any two or more surfactants of the type shown above can be used in the practice of my process provided the HLB value of the mixture is at least 10.

It is to be noted that in the HLB system for classifying surfactants that chemical type alone does not establish HLB value. Accordingly, in selecting a surfactant for use in my process, the HLB value rather than the chemical designation of the surfactant as cationic, anionic or non-ionic, is the controlling criterion. Several methods for determining the HLB value of a surfactant are given by Becher, above.

An example of an especially preferred surfactant, because of its anti-static properties, is Atlas Powder Company's product Atlas G–3780 (polyoxyethylene fatty amine) with an HLB value of about 25. Also, especially preferred are non-ionic fatty derivatives of polyoxyethylene sorbitan with HLB values of 10–17, as shown in the above list. Generally, hydrophilic surfactants having antistatic properties are preferred since their presence as a residual film on unwashed dried powder is desirable in handling the fine powder.

A surfactant concentration of about .05% by weight of the aqueous medium is sometimes effective, but a somewhat higher concentration such as 0.5% is preferably used. Even higher concentrations, up to about 3.0%, can be used but in some cases may tend to cause excessive sudsing. Therefore, the maximum amount of surfactant used in any event should be limited to that amount producing only a low volume of sudsing or foaming. This low sudsing amount of surfactant will vary somewhat for each surfactant and gel system. It can, however, be readily determined in a few trial runs. By a low volume of suds is meant an amount which does not interfere with the shearing action or of evaporation of the solvent and which does not overflow the process vessel with foam.

In carrying out the process, the surfactant is completely dispersed or dissolved in the hot aqueous medium and the gel is then introduced and subjected to shearing action to produce a fine dispersion of finely disintegrated gel particles. The shearing action is continued as the solvent is substantially leached from the particles by the surfactant in the aqueous medium resulting in a suspension of finely divided particles of resin in the aqueous medium.

The ratio of aqueous medium to resin gel used is dependent somewhat on the resin type and generally is in the range of about 2:1 to 5:1 by weight, preferably 2.5:1. The ratio may be adjusted as desired providing that the consistency of the total mass is kept sufficiently fluid so that it can be subjected to high-speed agitation of a shearing type. In many instances I have been able to employ a gel content as high as 35% of the total mass.

The shearing action used in the particle forming step is critical for disintegrating the gel into sufficiently small particles so that upon extraction, i.e. leaching, of the solvent from the gel by the surfactant in the aqueous medium, the leached resin particles are of an extremely small size, preferably not over 70 microns in diameter. Leaching of the gel praticles is also more easily achieved when the particles are of such suitable small size.

The shearing action used in practicing my invention is in the nature of a slicing force applied against the oversize gel particles. Means for producing such shearing action in a fluid medium are well known in the art. They include simple mixers with high-speed rotors on which are mounted sharp-edged blades and more complicated machines where shearing action is imparted to the gel by a high speed turbine-type rotor and a stator. The purpose of the shearing action is to cut or slice the larger gel particles into smaller ones which then are leached of solvent by the surfactant-containing aqueous medium. This shearing action is effective upon the resin so long as it is in gel form and becomes less and less effective as the gel phase becomes free of solvent, leaving solid polyolefin in suspension in the aqueous medium. Any mechanical means which will achieve this result can be used without departing from the scope of my invention. My surfactant-containing aqueous medium effectively leaches the solvent from the disintegrated gel particles before they can again agglomerate into large size particles. I have found that the higher the HLB value of the surfactant the slower is the leaching, and therefore, the finer the powder produced. Accordingly, by the use of a selected combination of a surfactant having a very high HLB value with a mixer providing vigorous shearing action, particles of optimum fineness can be produced.

A preferred type of dispersing and disintegrating means for practicing my process is one of the simple mixer type in which knife-edged blades mounted on a rotating shaft are used. A mixer of this type is represented in the well-known Waring Blendor. A variety of knife-bladed impeller designs are applicable, however, and the selection or fabrication of suitable ones is a matter of individual preference.

In using a knife-edged impeller of the above type to produce resin powder within the 5-70 microns range, I have found that shaft speeds of 5,000-15,000 r.p.m. are necessary in order to obtain particles finer than 70 microns in size and of a relatively narrow range of distribution. The optimum speed to produce a product of any desired size characteristics, of course, will depend to some extent on the particular resin being processed. If the shaft speed is reduced below 5,000 r.p.m. not only does the particle size increase greatly but the particle size distribution becomes much wider. For this reason speeds below 5,000 r.p.m. are not advantageous. Agitator shaft speeds in the range of 7,000-12,000 r.p.m. are especially advantageous and are preferred. The maximum particle sizes of powdered resin obtained at these preferred speeds under otherwise preferred conditions are found to vary between 35 and 70 microns and to have a particle size distribution range of about 20 to 30 microns.

The temperature at which the process is carried out depends on the type of resin and solvent used, as these factors determine the fusion point of the gel. The process temperature should be maintained at least several degrees below the fusion point of the particular polyolefin gel being disintegrated in order to prevent formation of agglomerates. I normally prefer to operate at temperatures not more than about 5 to 10 degrees below the fusion point because the rate of disintegration of the gel particles is favored by temperatures close to the fusion point. However temperatures substantially lower than the fusion point may be used, but preferably not below about 40° C.

Removing the solvent from the medium can be done in various ways, e.g. by continuously displacing the emulsified solvent by fresh aqueous leaching solution. My preferred method, however, is to use a volatile solvent and to remove the emulsified solvent progressively by evaporation as gel disintegration and leaching proceeds. Since the process temperature is below the normal boiling point of the solvent, it is desirable to volatilize the solvent by means of an introduced stream of air or inert gas or by application of vacuum. Since these operations are known to influence foaming they must be taken into consideration in selecting the amount of surfactant used, so that only a low sudsing amount is used.

At the end of the solvent removal step, the leached, finely powdered resin particles remain in the aqueous medium in a substantially solvent-free non-emulsified form. They are separated from the water by mechanical means such as filtration or centrifuging through a suitable filter medium. If desired, the residual film of surfactant on the dewatered particles can easily be removed by rinsing with water. The resin is then dried. In many cases, however, it is advantageous to retain the surfactant film, particularly when it imparts antistatic properties to the powder, thus facilitating the handling of the dried resin in its subsequent uses. The antistatic film on the powder is especially advantageous in increasing the bulk density of the powder.

Although the process of this invention is directed primarily toward producing a very fine powder from the higher density grades of polyethylenes, the low density grades of resins also can be successfully processed, and powder substantially coarser than 70 microns, but of a narrow distribution range, can be produced advantageously by modifying the operating conditions.

The practice of the invention is illustrated by the following examples. It is to be understood that the invention is not intended to be restricted to the specific illustrative examples and that other specific modifications which will be obvious to those skilled in the art are included by the invention. All parts are by weight unless otherwise stated.

EXAMPLE 1

Seven parts of polyethylene in form of commercial pellets and having a molecular weight of about 38,000 and a melt index of 0.3 are dissolved in about 33 parts of heptane at a temperature of about 90° C. with stirring. The solution is cooled to about 60° C. and allowed to stand until a gel forms. Excess solvent is decanted from the gel. 100 parts of water, heated to about 60° C. and containing 0.5 part of polyoxyethylene sorbitan monolaurate (HLB 13.3) are placed in a vented vessel equipped with a rotary type agitator fitted with a set of knife-edged agitator blades mounted at the bottom of the agitator shaft. The agitator is turned on and maintained at a shaft speed of about 10,000 r.p.m. The surfactant is completely dissolved in the water and the gel is then introduced into the vessel. The temperature of the mass in the vessel is kept in the range of 55° C. to 60° C. A stream of air is introduced into the vessel at the surface of the mass. The mass is continuously agitated during a period of about 50 minutes while the heptane solvent is slowly evaporated from the mass. The gel becomes dispersed throughout the aqueous medium in the form of fine gel particles which are sheared and disintegrated into finer particles by the agitator blades. Solvent is leached from the dispersed and disintegrated gel particles by the aqueous medium. The leached polyethylene particles remain suspended in the agitated surfactant-containing aqueous medium as the heptane solvent is evaporated. Upon completion of the evaporation step, the agitator is stopped. The solvent free polyethylene separates distinctly, forming an upper layer, and is easily separated from the aqueous medium by filtration through a porous filter. The particles are then rinsed with clean water and dried. Particle size of the so-produced polyethylene powder ranges from about 30 to 70 microns.

EXAMPLE 2

Following the general procedure of Example 1, a variety of polyolefin resins were disintegrated into products having particle sizes all below 70 microns. The results are shown in Runs 1–5 in Table 1. The data in Table 1 show that the process of this invention is equally successful with polyethylene of low, medium or high density and with polypropylene, as well as with polyethylene-polypropylene copolymer.

EXAMPLE 3

The effect of surfactants of different HLB values on the particle size of powdered polyolefin is shown in Runs 1–10 in Table 2. These runs, carried out according to the procedure of Example 1, show that when the HLB value is below 10, a coarser powder, i.e. larger in size than about 70 microns, is obtained. They also show that as a hydrophilic surfactant with an HLB value of 10 and higher is used the sizes of the particles decrease.

EXAMPLE 4

The effect of agitator speed on particle size of the powdered polyolefin is shown in Table 3. Runs 1–6 of Table 3 were carried out following the general procedure described in Example 1 and using 0.25 part of polyoxyethylene fatty amine (Atlas G–3780) at a temperature of 50°–65° C. Only the r.p.m. of the agitator shaft was varied. It is seen that while there is a fairly distinct difference in the particle size of the powder produced at 5000 and that produced at 7000 r.p.m., there is but a gradual change in the particle size range as the r.p.m. is increased above 7000 r.p.m.

Table 3

| Run No. | Resin | R.p.m. | Particle size, microns |
|---|---|---|---|
| 1 | Polyethylene | 5,000 | 35–70 |
| 2 | do | 7,000 | 15–55 |
| 3 | do | 8,000 | 15–50 |
| 4 | do | 9,000 | 15–50 |
| 5 | do | 11,000 | 15–40 |
| 6 | do | 12,000 | 15–35 |

Many widely different embodiments of this invention may be made and many process variables obvious to those skilled in the art may be introduced without departing from the scope and spirit thereof and it is to be understood that my invention includes all such embodiments and is not to be limited by the above description.

I claim:

1. A process for producing finely divided polyolefin powder which consists essentially of the steps of dispersing and distintegrating into fine particles, by means of shearing action a preformed gel consisting of polyolefin resin selected from the group consisting of polyethylene, polypropylene, and copolymers of ethylene and propylene with other olefins and a volatile nonpolar organic solvent in an aqueous medium containing a low-sudsing amount of a hydrophilic surfactant having a hydrophile-lipophile balance value of at least 10 at a temperature below the fusion point of said gel, leaching the solvent from said particles by means of said medium, removing the solvent from said medium, and filtering said medium to recover said particles.

2. The process according to claim 1 in which the resin is polyethylene.

3. The process according to claim 1 in which the resin is polypropylene.

4. The process according to claim 1 in which the resin is a copolymer of ethylene and propylene.

5. The process according to claim 1 in which the solvent is removed by evaporation upon being leached from the gel.

6. The process according to claim 5 in which the resin is separated from the solvent free aqueous medium to obtain a substantially anhydrous powder.

Table 1

| Run No. | Resin | | | | Solvent | | Surfactant | | | Water, parts | Shaft speed, r.p.m. | Temp., °C | Product size, microns |
|---|---|---|---|---|---|---|---|---|---|---|---|---|---|
| | Type | Sp. gr. | Melt index | Parts | Type | Parts | Type | HLB value | Parts | | | | |
| 1 | Lower density polyethylene.[1] | 0.92 | 0.3 | 7 | Heptane blend. | 33 | Polyoxyethylene fatty amine.[6] | 25 | 0.5 | 100 | 12,000 | 40–60 | 14–35 |
| 2 | Medium density polyethylene pellets.[2] | 0.938 | 1.0 | 5 | do | 40 | do | 25 | 0.5 | 100 | 13,000 | 60–70 | 14–42 |
| 3 | High density polyethylene.[3] | 0.96 | 0.7 | 5 | Xylene | 45 | do | 25 | 0.25 | 100 | 13,000 | 65–75 | 21–56 |
| 4 | Polypropylene.[4] | 0.901 | | 4 | do | 36 | do | 25 | 0.25 | 100 | 12,000 | 65–75 | 14–49 |
| 5 | Polyethylene-polypropylene copolymer.[5] | | | 3.5 | do | 42 | do | 25 | 0.5 | 100 | 12,500 | 60–75 | 7–56 |

[1] Tenite 810, a product of Eastman Chemical Products, Inc.
[2] Hi-D, a product of Spencer Chemical Company.
[3] Grex 100, a product of W. R. Grace & Co., Polymer Chemicals Division.
[4] Pro-Fax, a product of Hercules Powder Company.
[5] Grex, a product of W. R. Grace & Co., Polymer Chemicals Division.
[6] Atlas G 3780, a product of Atlas Powder Company.

Table 2

| Run No. | Surfactant | HLB value | Product size, microns |
|---|---|---|---|
| 1 | Sorbitan sesquioleate | 3.7 | >70 |
| 2 | Sorbitan monooleate | 4.3 | >70 |
| 3 | Sorbitan monolaurate | 8.6 | >70 |
| 4 | Polyoxyethylene sorbitan monooleate | 10.0 | <70 |
| 5 | Polyoxyethylene alkyl aryl ether | 13 | <70 |
| 6 | Polyoxyethylene sorbitan monolaurate | 13.3 | <70 |
| 7 | Polyoxyethylene sorbitan monooleate | 15.0 | <60 |
| 8 | Polyoxyethylene sorbitan monolaurate | 16.7 | <60 |
| 9 | Polyoxyethylene fatty amine with polyoxyethylene sorbitan monolaurate, 4:1 ratio. | 22 | <45 |
| 10 | Polyoxyethylene fatty amine | 25 | <35 |

7. The process according to claim 1 in which the surfactant has a hydrophile-lipophile balance value of from about 10 to about 30.

8. The process according to claim 1 in which the surfactant is present in an amount of from about 0.05% to 3.0% by weight of the aqueous medium.

References Cited by the Examiner

UNITED STATES PATENTS

| | | | |
|---|---|---|---|
| 2,290,794 | 7/1942 | Alvarado | 260—94.9 |
| 2,313,144 | 3/1943 | Gomm | 260—29.6 |
| 2,449,489 | 7/1947 | Larson | 260—29.6 |
| 3,073,790 | 1/1963 | Bosoni | 260—29.6 |

FOREIGN PATENTS

| | | |
|---|---|---|
| 583,896 | 11/1959 | Belgium. |
| 571,814 | 9/1945 | Great Britain. |
| 617,052 | 1/1949 | Great Britain. |
| 721,908 | 1/1955 | Great Britain. |
| 602,169 | 2/1960 | Italy. |

OTHER REFERENCES

Hackh's Chemical Dictionary, McGraw-Hill, New York (1944).

MURRAY TILLMAN, *Primary Examiner.*

ALPHONSO D. SULLIVAN, LEON J. BERCOVITZ, JAMES A. SEIDLECK, RONALD W. GRIFFIN, EDWARD J. TROJNAR, *Assistant Examiners.*